United States Patent
Witzky

[15] 3,703,886
[45] Nov. 28, 1972

[54] PUMPLESS STRATIFIED CHARGE GAS ENGINE

[72] Inventor: Julius E. Witzky, 121 Riviera Drive, San Antonio, Tex. 78213

[22] Filed: Nov. 9, 1970

[21] Appl. No.: 87,753

[52] U.S. Cl. ............................. 123/32 ST, 123/120
[51] Int. Cl. ......................... F02b 9/06, F02d 39/04
[58] Field of Search ................... 123/32 ST, DIG. 4

[56] References Cited

UNITED STATES PATENTS

| 2,882,873 | 4/1959 | Witzky | 123/32 ST |
| 3,154,059 | 10/1964 | Witzky et al. | 123/32 ST |
| 3,425,399 | 2/1969 | Ward et al. | 123/32 ST |
| 3,572,298 | 3/1971 | Onishi et al. | 123/32 ST |

Primary Examiner—Laurence M. Goodridge
Assistant Examiner—Cort Flint
Attorney—Howson and Howson

[57] ABSTRACT

A pumpless four cycle internal combustion engine for lighter-than-air gaseous fuels such as natural gas. The gas at a controlled low pressure is admitted to a gas chamber adjoining the engine combustion chamber by a check valve during the intake stroke while unthrottled air enters the combustion chamber and is given a swirling motion by suitable means at the air intake valve. During the compression stroke, the swirling air draws the gaseous fuel from the gas chamber and, due to the lower specific weight of the fuel, swirls the fuel spirally toward a centrally located glow plug. At the end of the compression stroke, the fuel charge is stratified around the glow plug in a concentric pattern whereupon ignition occurs.

3 Claims, 8 Drawing Figures

INVENTOR:
JULIUS E. WITZKY
BY
Howson & Howson
ATTYS

INVENTOR:
JULIUS E. WITZKY
BY
Howson & Howson
ATTYS.

PUMPLESS STRATIFIED CHARGE GAS ENGINE

The present invention relates generally to internal combustion engines and relates more particularly to a pumpless stratified charge engine adapted to burn gaseous fuels which are lighter than air.

In the present engine, the intake air is not throttled. In engines of this type, in order to permit proper part load operation, it is necessary that the fuel charge be stratified to present an ignitable mixture to the ignition source. Otherwise, the fuel-air mixture would be too lean for ignition.

In U.S. Pat. No. 3,425,399, issued Feb. 4, 1969 and assigned with the present application to a common assignee, a related type of gas engine is disclosed. In that engine, wherein the intake air is not throttled, a stratified fuel charge is maintained by the combustion chamber air flow and advanced during the compression stroke across a strategically located glow plug. Although a stratified charge is employed in the present invention, the manner in which the charge is stratified and the engine structure providing the fuel stratification is distinctly different from that of the above patent.

In the present engine, during the intake stroke the air entering the combustion chamber is given a swirling motion by swirl ports or a shroud at the intake valve. At the same time, a charge of gaseous fuel is admitted into a gas chamber opening into the combustion chamber by a check valve actuated by the pressure differential between the low gas supply pressure and the lower combustion chamber pressure during the intake stroke. During the compression stroke, the swirling air in the combustion chamber draws the gas from the gas chamber into the combustion chamber and, since the gas has a specific weight less than that of the air, the heavier air is by centrifugal force moved toward the walls of the combustion chamber while the gaseous fuel moves spirally toward the vertical axis of the chamber. The fuel charge is stratified concentrically about a centrally positioned glow plug at the end of the compression stroke to permit ignition of the charge.

It is accordingly a primary object of the present invention to provide a novel internal combustion engine adapted to burn gaseous fuels lighter than air and particularly natural gas.

A further object of the invention is to provide an engine as described which does not require air throttling, fuel mixing or timing, or spark ignition systems.

Another object of the invention is to provide an engine as described wherein a pumping or high pressurization of the gaseous fuel is unnecessary and wherein the fuel is admitted to the cylinder by a simple check valve.

A still further object of the invention is to provide an engine as described which due to fuel stratification can operate at a relatively high compression ratio without the danger of pre-ignition.

Another object of the invention is to provide an engine as described of a simple design which is economical to manufacture and operate.

Additional objects and advantages of the invention will be more readily apparent from the following detailed description of an embodiment thereof when taken together with the accompanying drawings in which.

Figure 2:
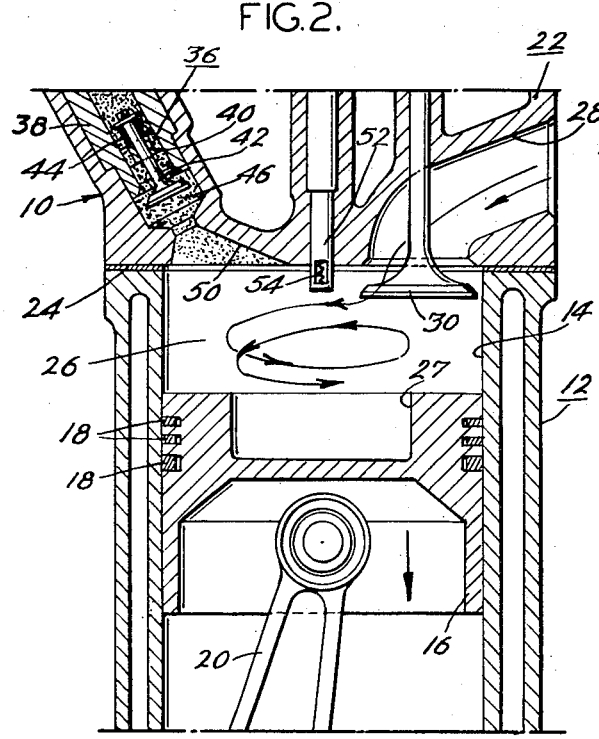
FIG. 2 is a sectional view taken along line 2—2 of FIG. 1.
Figure 1:
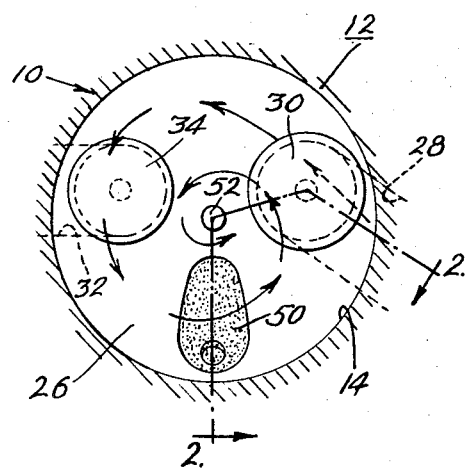
FIG. 1 is a partial horizontal sectional view through an engine cylinder embodying the present invention showing the swirling motion of the intake air during the intake stroke of the piston.

Referring to the drawings and particularly FIGS. 1 and 2 thereof, an internal combustion engine generally designated 10 is illustrated which includes a cylinder block 12 having a cylinder 14 therein. A piston 16 having piston rings 18 is adapted for reciprocating movement within the cylinder 14 and is connected by connecting rod 20 to a crankshaft (not shown) for delivery of power from the engine in a conventional manner. A cylinder head 22 is secured to the cylinder block with a gasket 24 therebetween. The piston, cylinder walls, and the cylinder head cooperate to form the combustion chamber 26. A cylindrical auxiliary combustion chamber 27 is formed in the piston and opens into combustion chamber 26.

The cylinder head 22 includes a tangentially arranged air inlet port 28 and an intake valve 30 cooperating therewith for admitting swirling air into the combustion chamber. The swirling of the intake air may alternatively be effected by means of a shroud at the intake valve. An exhaust port 32 is similarly provided with exhaust valve 34 of a conventional construction. The intake valve 30 and exhaust valve 34 are actuated in a conventional manner by an engine operated cam shaft to respectively admit intake air and exhaust combustion products in timed relationship with the engine four stroke cycle.

Gaseous fuel such as natural gas is introduced into the combustion chamber from a low pressure source through a simple check valve 36. A cylindrical check valve body 38 mounted in the cylinder head 22 includes a central spider 40 having a bore therethrough to slidably guide the shank portion of the valve element 42. A valve spring 44 extends between the spider and a spring retainer on the end of the valve element to urge the valve into the normally closed position. A gas chamber 46 is provided directly below the valve 36 and communicates with the combustion chamber 26 through the downwardly flaring throat 50.

A glow plug 52 is seated in the cylinder head with the glow plug wire 54 extending into the combustion chamber substantially along the vertical axis of the combustion chamber. The glow plug is connected to a suitable source of current (not shown) which is utilized to heat the plug only during starting of the engine. After the engine is in operation, the heat of combustion keeps the glow plug wire in a glowing condition to provide an ignition source for the fuel-air mixture.

For operation, the check valve 36 is connected with a source of gaseous fuel lighter than air such as natural gas under a low pressure, preferably below 5 psi. The glow plug 52 is heated by passage of current through wire 54 to permit starting of the engine.

Upon the cranking of the engine, during the downward intake stroke of the piston as shown in FIGS. 1 and 2, the intake valve 30 is opened and air is admitted through the intake port 28 into the combustion chamber 26. The incoming air is given a swirling motion due to the substantially tangential alignment of the port 28 with the combustion chamber wall. Simultaneously, the descending piston lowers the pressure in the combustion chamber and also in the gas chamber 46, thereby opening the check valve 36 and permitting the gaseous fuel to flow into the gas chamber 46. The exhaust valve is, of course, closed during the intake stroke.

Figure 4:
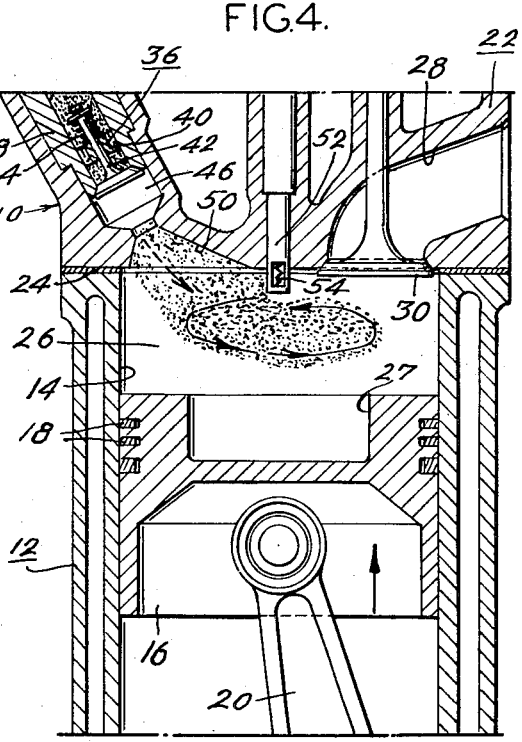
FIG. 4 is a sectional view similar to FIG. 2 and showing the pattern of movement of the gaseous fuel charge during the compression stroke as in FIG. 3.
Figure 3:
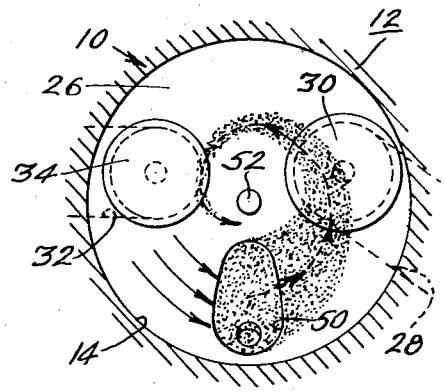
FIG. 3 is a view similar to FIG. 1 showing the spiral motion of the gaseous fuel charge during the compression stroke of the engine.

As shown in FIGS. 3 and 4, during the ascending compression stroke of the piston with the intake and exhaust valves closed, the increasing pressure in the combustion chamber closes the check valve 36. The swirling intake air during the compression stroke draws the gaseous fuel charge from the gas chamber 46 and throat 50 and, due to the centrifugal forces acting on the heavier air, serves to move the gaseous fuel spirally toward the vertical axis of the combustion chamber along which the glow plug 52 is located.

Figure 6:
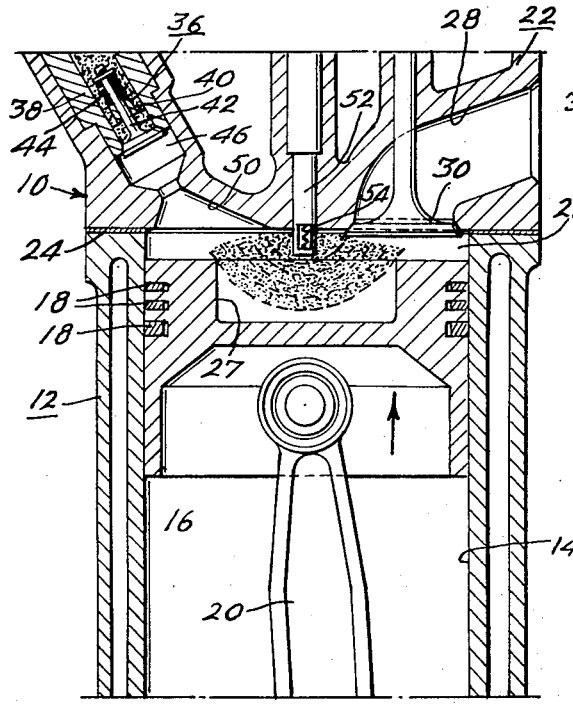
FIG. 6 is a view similar to FIG. 2 showing the fuel charge at the end of the compression stroke as in FIG. 5.
Figure 5:
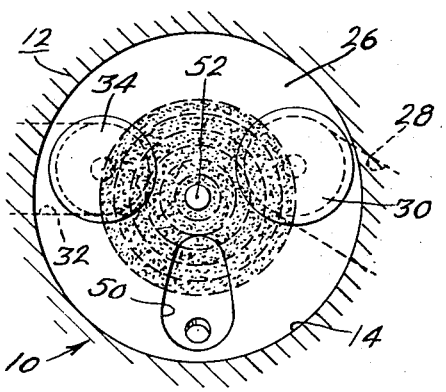
FIG. 5 is a view similar to FIG. 1 showing the stratification of the fuel charge around the glow plug at the end of the compression stroke.

At the end of the compression stroke as illustrated in FIGS. 5 and 6, the gaseous fuel charge is stratified concentrically about the vertical axis of the cylinder and hence about the glow plug wire 54. At the condition shown in FIGS. 5 and 6 just before the end of the compression stroke, it will be noted that the periphery of the combustion chamber is essentially free of gaseous fuel thus eliminating the preignition typically experienced in this region in conventional gas engines. The auxiliary chamber 27 of the piston accommodates the downwardly extending glow plug and the surrounding stratified charge at the end of the compression stroke.

Figure 8:
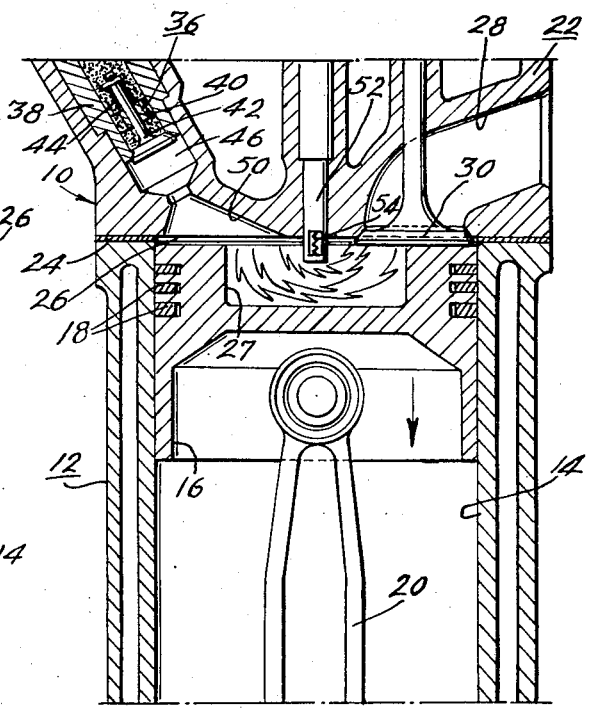
FIG. 8 is a view similar to FIG. 2 showing the ignition of the charge at the start of the expansion stroke as in FIG. 7.
Figure 7:
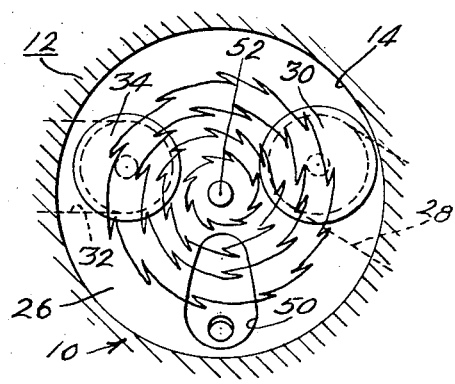
FIG. 7 is a view similar to FIG. 1 showing the ignition of the stratified charge at the start of the expansion stroke.

In FIGS. 7 and 8, the ignition of the fuel charge at the start of the expansion stroke is shown. As schematically illustrated, the fuel charge burns in a uniform manner outwardly from the glow plug. At the conclusion of the expansion stroke, the exhaust valve opens in the conventional manner to exhaust the products of combustion during the upward exhaust stroke of the piston.

The amount of fuel entering the engine and hence the engine speed and power, are controlled by regulating the pressure of the fuel delivered to the check valve 36. Although a single cylinder is illustrated, it is obvious that an engine embodying the invention could employ one or a plurality of such cylinders as desired.

The glow plug requires external heating only for starting the engine and thereafter operates on the engine combustion heat, thereby eliminating the spark plug and complicated ignition system typical of conventional engines. Recent advances in glow plug design utilizing the unusual heat resistance properties of platinum-rhodium and platinum-tungsten alloys permit the sustained use of a glow plug opening directly into the engine combustion chamber in the manner of the presently illustrated embodiment.

Because of the stratification of the fuel adjacent the centrally located glow plug, only air is present in the peripheral area of the combustion chamber and therefore the knocking of the end gases as experienced in conventional gas engines is avoided. The compression ratio of the engine can therefore be higher than normally possible with throttled gas engines.

As indicated, the present engine is operative only with gaseous fuels lighter than air. The preferred fuel for the engine is natural gas which has a specific weight of 0.61. Because the specific weight of the gaseous fuel is less than the specific weight of the air, the gas swirls in the manner of a logarithmic spiral toward the center of the combustion chamber. Since the shape of the spiral is not affected by the speed of the engine or change in swirl velocity, the desirable stratifying effect produced by the swirling air is constant throughout the speed range of engine operation.

Similarly, other changes in details of construction can be effected by those skilled in the art without departing from the spirit and the scope of the invention.

I claim:

1. An internal combustion engine for lighter-than-air gaseous fuels comprising cylinder and piston means defining a combustion chamber, means for charging said combustion chamber with air and discharging products of combustion therefrom, a gas chamber communicating with said combustion chamber, a check valve associated with said gas chamber and adapted for delivering a charge of lighter-than-air gaseous fuel from a low pressure source to said gas chamber during the intake stroke of said piston means, a glow plug extending into said combustion chamber substantially along the cylindrical axis of said combustion chamber, and means associated with said charging means for imparting a swirling motion to the intake air entering said combustion chamber, said gas chamber opening into said combustion chamber along the path of the swirling intake air to permit the swirling intake air to draw the gaseous fuel from the gas chamber and provide a centrifugal separation of the air and lighter fuel and hence a spiral movement of the fuel toward the axis of the combustion chamber to provide a stratification of the fuel charge around said glow plug for ignition thereby.

2. A four cycle internal combustion engine for lighter-than-air gaseous fuels comprising a cylinder block having a cylinder therein, a piston slidably disposed in said cylinder, means connected with said piston for translating reciprocatory piston motion into rotary motion, a cylinder head secured to said cylinder block, said cylinder, piston and cylinder head defining a combustion chamber, means in said cylinder head for charging said combustion chamber with air and discharging products of combustion therefrom, a gas chamber in said cylinder head communicating with said combustion chamber, a check valve associated with said gas chamber and adapted for delivering a charge of lighter-than-air gaseous fuel from a low pressure source to said gas chamber during the intake stroke of said piston, a glow plug in said cylinder head extending into said combustion chamber substantially along the cylindrical axis of said combustion chamber, and means associated with said charging means for imparting a swirling motion to the intake air entering said combustion chamber, said gas chamber opening into said combustion chamber along the path of the swirling intake air to permit the swirling intake air to draw the gaseous fuel from the gas chamber and provide a centrifugal separation of the air and lighter fuel and hence a spiral movement of the fuel toward the axis of the combustion chamber to provide a stratification of the fuel charge around said glow plug for ignition thereby.

3. A four cycle internal combustion engine for lighter-than-air gaseous fuels comprising a cylinder block having a cylinder therein, a piston slidably disposed in said cylinder, means connected with said piston for translating reciprocatory piston motion into rotary motion, a cylinder head secured to said cylinder block, said cylinder, piston and cylinder head defining a combustion chamber, means in said cylinder head for charging said combustion chamber with air and discharging products of combustion therefrom, said latter means comprising an air intake port and valve, and an exhaust port and valve in said cylinder head, a gas chamber in said cylinder head communicating with said combustion chamber, conduit means for delivering a gaseous fuel from a low pressure source to said gas chamber, a check valve connecting said conduit means with said gas chamber and adapted for delivering a charge of lighter-than-air gaseous fuel from a low pressure source to said gas chamber during the intake stroke of said piston, a glow plug in said cylinder head extending into said combustion chamber substantially along the cylindrical axis of said combustion chamber, an axially concentric cylindrical auxiliary combustion chamber in said piston opening into said combustion chamber, and means associated with said charging means for imparting a swirling motion to the intake air entering said combustion chamber, said gas chamber opening into said combustion chamber along the path of the swirling intake air to permit the swirling intake air to draw the gaseous fuel from the gas chamber and provide a centrifugal separation of the air and lighter fuel and hence a spiral movement of the fuel toward the axis of the combustion chamber during the compression stroke of the piston to provide a stratification of the fuel charge around said glow plug for ignition thereby.

* * * * *